United States Patent [19]

Heinecke

[11] Patent Number: 5,464,035
[45] Date of Patent: Nov. 7, 1995

[54] GATE-TYPE, SIDE-PORTED, LINE BLIND VALVE

[75] Inventor: Richard L. Heinecke, Belden, Miss.

[73] Assignee: ITT Corporation, New York, N.Y.

[21] Appl. No.: 263,307

[22] Filed: Jun. 21, 1994

[51] Int. Cl.$^6$ ............................. F16K 3/02; F16K 43/00
[52] U.S. Cl. .................... 137/312; 137/315; 138/943; 251/327; 251/328
[58] Field of Search .................... 137/312, 315; 138/94, 94.3; 251/327, 328, 329

[56] References Cited

U.S. PATENT DOCUMENTS

| | | | |
|---|---|---|---|
| 3,000,608 | 9/1961 | Williams | 251/329 |
| 3,026,084 | 3/1962 | Bryant | 251/327 |
| 3,266,517 | 8/1966 | Carr | 251/328 |
| 4,174,728 | 11/1979 | Usnick et al. | 251/328 |
| 4,383,546 | 5/1983 | Walters, Jr. | 251/327 |
| 4,476,730 | 10/1984 | Brumm | 73/861.61 |
| 4,938,250 | 7/1990 | Peterson | 251/329 |
| 4,962,785 | 10/1990 | Clifford | 251/327 |
| 5,271,426 | 12/1993 | Clarkson et al. | 251/328 |

*Primary Examiner*—George L. Walton
*Attorney, Agent, or Firm*—Menotti J. Lombardi

[57] ABSTRACT

A walled body, has apertures formed in front and rear walls thereof in which resilient seats are set. The latter sealingly engage a plate-type gate, centrally apertured for alignment with the seats, to define a portway through which to convey pipeline media. The gate is movable through the body to open and close the portway, and the body has sealing at the top and bottom to define thereof a pressure-containing shell. Further, sides of the body have openings formed therein, sealed off by removable plates. Exposure of the side openings allow for the venting of any seat leakage to the atmosphere, and inhibit any chance of solids buildup around the seats. The body is boltable to an upstream pipe of a pipeline, or for interpositioning in a pipeline.

12 Claims, 4 Drawing Sheets

GATE-TYPE, SIDE-PORTED, LINE BLIND VALVE

BACKGROUND OF THE INVENTION

This invention pertains, generally, to gate-type valves, and in particular to gate-type, line blind valves. Line blind valves are commonly used to blank off pipelines. The traditional method of blanking off pipelines, for service work within a vessel or pipeline, has been to unbolt the pipe at an adjacent flange, and rebolt a blind flange onto the pipe to be sealed. This leaves the downstream pipe or vessel open to atmosphere, and safe for servicing. This is a time-consuming and labor-intensive process.

An alternative approach is to use a line blind valve, namely, a dual, rubber-seated, through-ported valve. Such a valve acts as an extension of the pipeline, in the open position, and in the closed position, it acts as a blind flange, in that any leakage past the valve seal will leak to atmosphere, and not into the downstream pipeline or vessel.

The line blind valves which are currently being used for the servicing of pipelines and such have a major drawback. When the valves are cycled, the media will leak through the seals and, if not contained, will spill onto the ground or pass into the atmosphere.

The problem of media spillage can be solved by placing a pressure-containing shell around the valve seals to contain the leakage. When the valve is in the closed position, the pressure-containing shell must then be opened to function as a line blind, allowing any seal leakage to vent to the atmosphere. A subsequent problem, when using a pressure-containing shell, is to ensure that any solids in the media will not collect inside the shell and plug the body cavities. If the latter should happen, there is the possibility that the media could leak into the downstream pipe or vessel. Any such pressure-containing shell must be designed to contain the pipeline pressure during cycling, but also be configured to be freely open to the atmosphere when serving as a line blind.

SUMMARY OF THE INVENTION

To overcome the aforesaid problems, it is an object of this invention to set forth a line blind valve, of the gate-type, which defines a pressure-containing shell, and a line blind valve which can be freely opened to the atmosphere when it is serving as a line blind.

Particularly, it is an object of this invention to disclose a gate-type, line blind valve, comprising a body having spaced-apart, front and rear walls, and side walls joined to said front and rear walls; wherein all said walls comprise means for cooperatively defining a valve shell having an interior; and apertures formed in said front and rear walls; resilient seats set in said apertures; gating means interposed, and movable, between said front and rear walls, for (a) sealingly engaging said seats, and (b) exposing said apertures to, and occluding said apertures from, the ambient; and wherein said side walls have porting means for exposing said interior of said shell to, and occluding said interior from, the ambient.

Further objects of this invention, as well as the novel features thereof, will be apparent by reference to the following description, taken in conjunction with the accompanying figures.

DESCRIPTION OF THE PREFERRED EMBODIMENT

Figure 1:
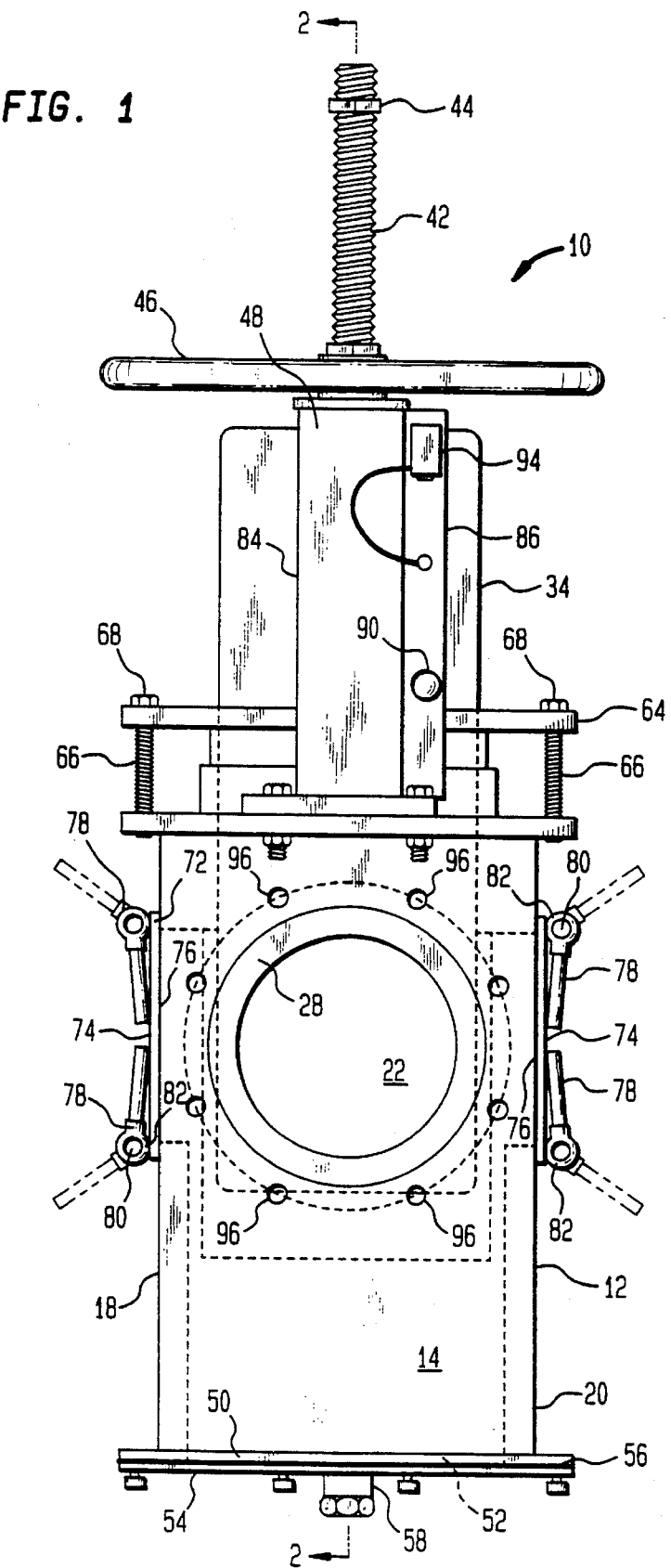
FIG. 1 is a front, vertical elevational view of the novel valve, according to an embodiment thereof, shown in the open position.
Figure 2:
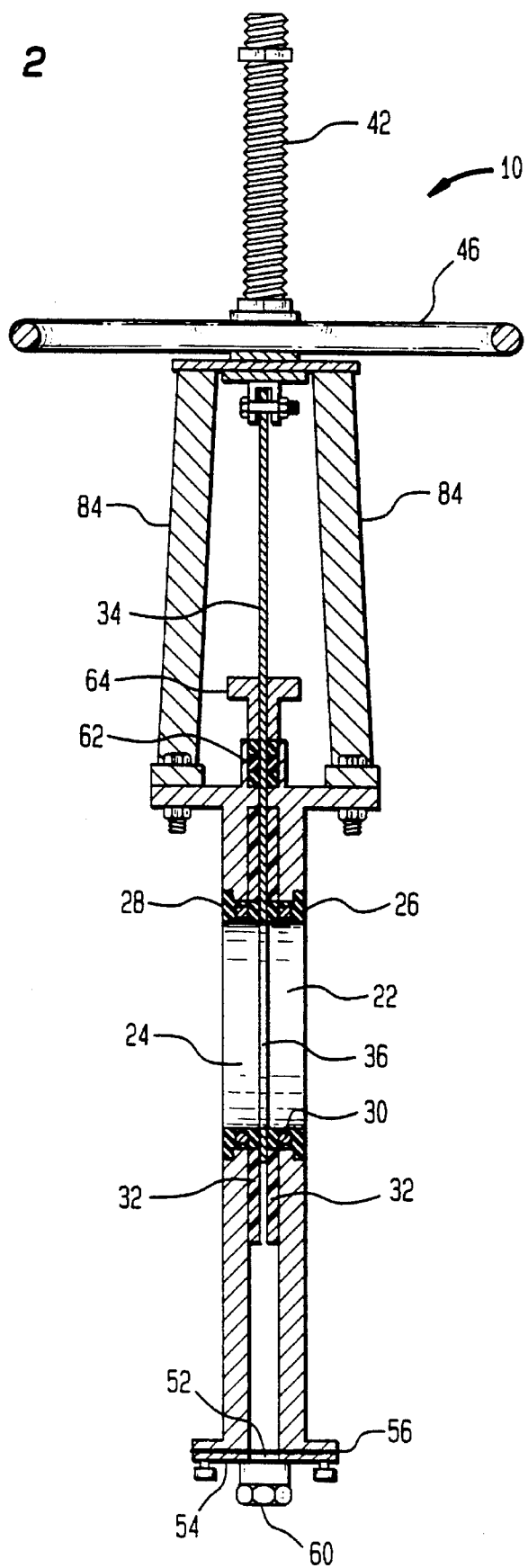
FIG. 2 is a cross-sectional view taken along section 2—2 of FIG. 1.

The gate-type, line blind valve 10 has a body 12 having spaced-apart, front and rear walls 14 and 16, respectively, and side walls 18 and 20, respectively. The front and rear walls 14 and 16 have apertures 22 and 24 formed therein, and annular, resilient seats 26 and 28 are set in the apertures. Each of the seats 26 and 28 have annular, metal inserts 30 embedded therein to provide a warranted rigidity to the seats. Apertured body liners 32 are secured in the body 12, between the walls 14 and 16; the apertures in the liners 32 receive the seats 26 and 28 therein. An apertured, elongate, plate-type gate 34 is slidably interposed between the liners 32; its aperture 36 has a diameter which corresponds to the common diameter of apertures 22 and 24.

Figure 3:
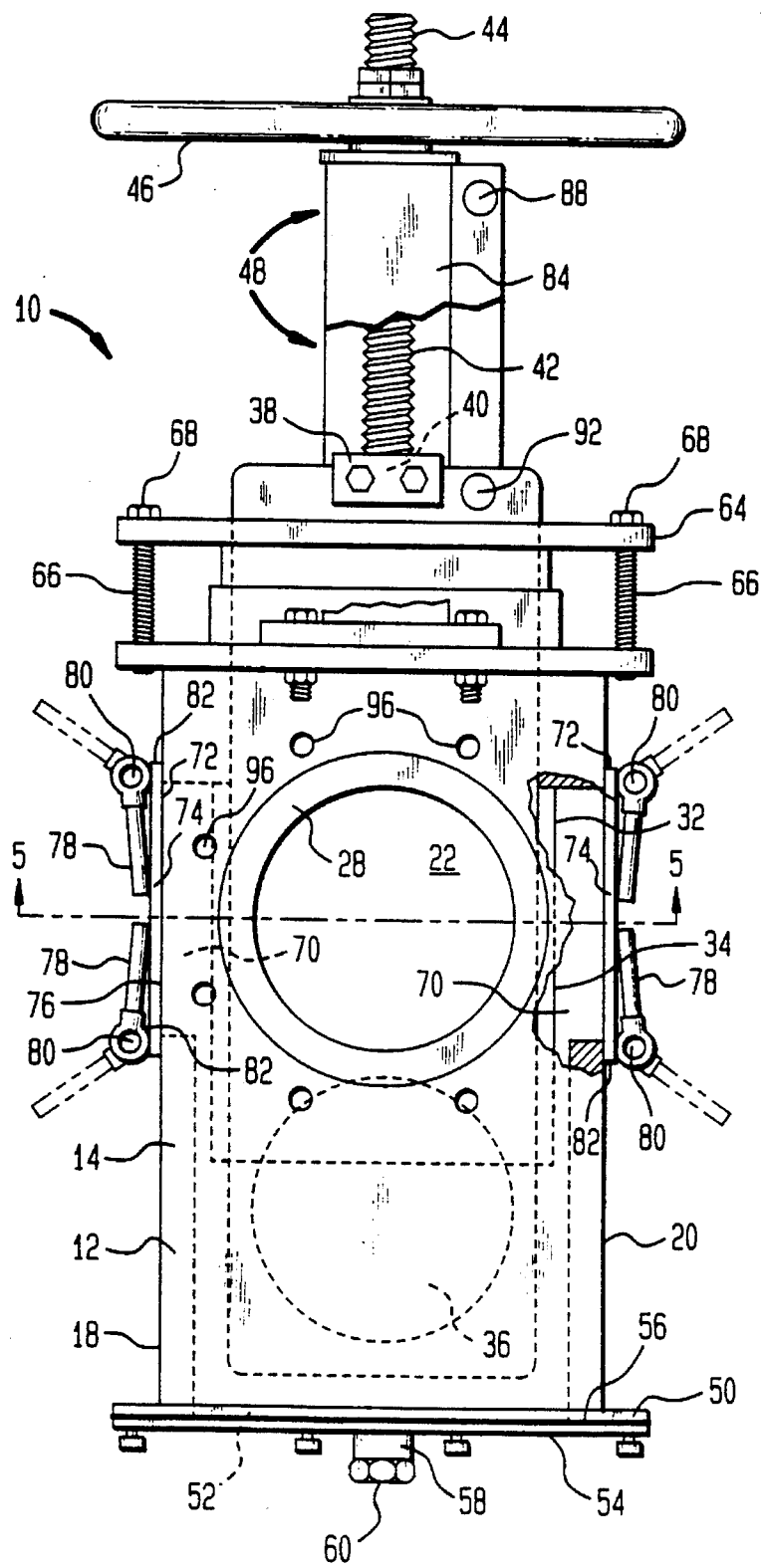
FIG. 3 is a view like that of FIG. 1, of the novel valve, showing it in a closed position.

An uppermost end of the gate 34 is fastened to a clamp 38. An end of a threaded rod 42 is welded to the clamp 38, and the opposite end of the rod 42 is rotatably journaled to a handwheel 46 and has a limit stop 44 fixed thereto. The internally-threaded handwheel 46 is rotatably journaled atop a stanchion 48, and receives the rod 42 therethrough. Consequently, rotation of the handwheel 46 causes the gate 34 to rise or descend, relative to the stanchion 48, and to slide between the liners 32. FIG. 1 shows the gate 34 elevated, with its aperture 36 in direct alignment with the apertured seats 26 and 28, and with the apertures in the liners 32. FIG. 3 shows the gate 34 lowered in the body 12, with its aperture 36 fully removed from the apertures 22 and 24.

At the bottom of the body 12 there is a base 50, the latter having a void 52 formed centrally therein. A sealing plate 54, having a gasket 56 thereon, is bolted to the base 50. A conduit 58, which communicates with the interior of the body 12, extends outwardly from the plate 54, and a removable plug 60 is set in the conduit. By the aforedescribed components, the lower end of the body is pressure-sealed. The upper end of the body 12 is also sealed, to define a pressure-containing shell thereof. The gate 34 has a packing or seal 62 in circumscription thereof, atop the body 12 and at the base of the stanchion 48. Too, a packing gland 64 is forceably engaged with the seal 62, and is adjustably arranged for tightening against the seal 62 by means of studs 66 and nuts 68 bridging the gland 64 to the top of the body 12.

As the aforesaid evidences, the sealed body 12 presents a pressure-containing shell, but it can be freely opened to the atmosphere when it is functioning as a line blind. The side walls 18 and 20 are also ported. Each of the walls 18 and 20 has an opening 70 formed therein. The openings 70 fully expose the interior of the shell of the body 12, and the gate 34. However, closures 72 are provided for sealing off the openings 70.

Closures 72 comprise rectangular plates 74 which fully overlie the openings 70. Too, each of the plates has a sealing gasket 76 thereon. In this embodiment of the invention, the plates 74 are held, sealingly, against the walls 18 and 20, in closure of the openings 70, by means of clamps 78 which are rotatably mounted to the side walls 18 and 20 by eye-bolts 80. The clamps 78 have camming surfaces 82 which, when the clamps are in the full-line illustrations thereof in FIGS. 1 and 3, press the plates 74 (and gaskets 76) fast up against the side walls 18 and 20, fully sealing off the openings 70. When the clamps 78 are in the dispositions thereof shown in phantom, in FIGS. 1 and 3, the plates are released from the side walls, and can be withdrawn to expose the openings 70; the camming surfaces, then, are rotated away from the plates 74.

Figure 4:
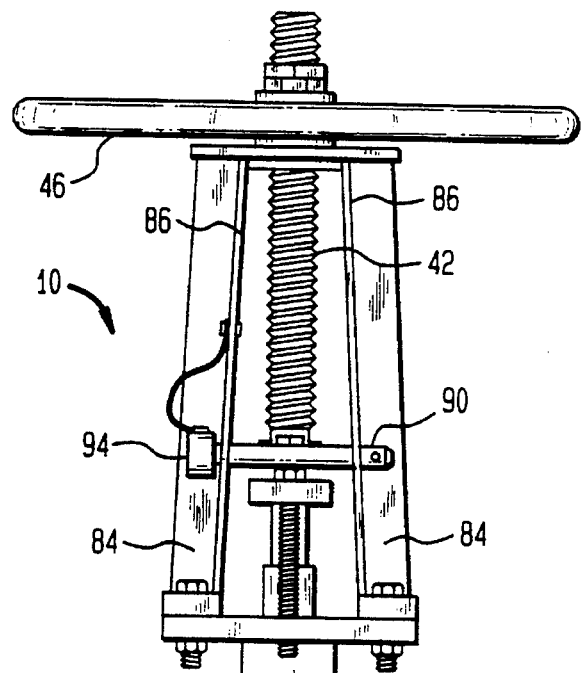
FIG. 4 is a side elevational view of the valve, the same taken from the right-hand side of FIG. 3.
Figure 5:
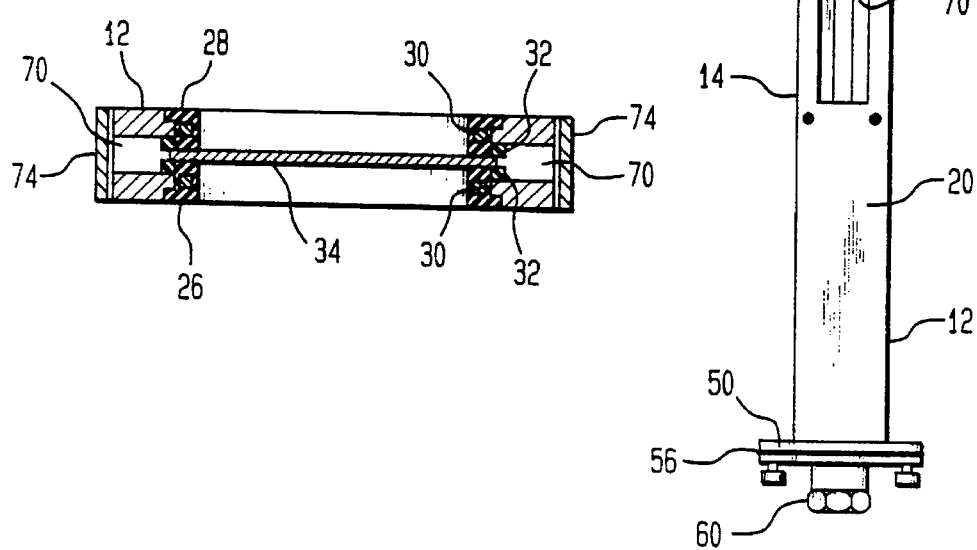
FIG. 5 is a cross-sectional view taken along section 5—5 of FIG. 3.

With particular reference to FIGS. 1, 3 and 4 it can be seen that the stanchion 48 comprises a pair of limbs 84, and each of the limbs 84 has a narrow, elongate web 86 extending therefrom. The webs 86 have pin holes 88 and 90 formed therethrough, the same being provided to align with a pin hole 92 formed in the uppermost end of the gate 34. A lock-out pin 94, tethered to one of the limbs 84, is used to penetrate the holes 88 and 92, or holes 90 and 92, to fix the gate 34 in the valve closed, or the valve open condition, respectively.

The holes 96, shown in FIGS. 1 and 3, are flange bolt holes used for bolting the valve 10 to mating flanges of a pipeline. The dual seats 26 and 28, of course, seal the pipeline (not shown) in the open and closed valve positions. Too, the tight sealing of the body 10, defining a pressure-containing shell thereof, prevents the pipeline media from spilling or leaking during cycling. The especially unique feature of the valve 10 comprises the side openings 70, and the cover plates 74 therefor. The plates on the side of the valve 10 can easily be removed when the valve 10 is closed, opening the seats 26 and 28 to atmosphere or the ambient on all sides. This also eliminates pockets in the body 12 where solids can accumulate and cause downstream leakage.

As noted, then, the body 12 acts as a pressure-containing shell, and mounts between mating pipe flanges (not shown). The two resilient seats 26 and 28 are held in the body 12 and the apertures 22 and 24 by the mating flanges, and are compressed against the gate 34 to effect a seal. The gate 34 fits between the seats 26 and 28 and extends out the top of the body 12 where the packing seal 62 fits around the gate 34. The gland 64 compresses the seal 62 into the body 12 and against the gate 34 to effect the seal around the gate 34. The two body liners 32, as noted, act as guides for the gate 34, and support the gate 34 when the gate is closed and pressure acts on one side thereof. When the gate 34 is in the closed or open disposition, the two resilient seats 26 and 28 act to seal the pipeline pressure from the body cavity. Only during cycling is the body cavity exposed to pipeline pressure.

The bottom access plate 54 is bolted over the void 52 in the base 50 of the body 12, and is removed for line blind service. As for the plug 60, in the access plate 54, it is used to release pressure within the body 12 after the gate 34 is closed, and before the side vent openings 70 are exposed.

It will be clear that the two, side vent openings 70, one on each side of the body 12, when open allow for the venting of any seat leakage to the atmosphere or ambient, and eliminate the chance for a solids buildup around the seats 26 and 28, particularly in the body chamber above the centerline of the valve portway. The vent plates 74 seal the openings 70 when the valve 10 is cycling and prevent spillage, being held in place by the clamps 78. To convert the body from a pressure-containing shell to an open line blind, the clamps 78 are loosened and the side plates 74 are rotated away from the openings 70.

For safety purposes, a series of lockout steps is followed to ensure safe use of the valve 10. The line blind function is initiated by first closing the valve gate 34 and locking it into position with the lockout pin 94. Second, the vent valve plug 60 is removed to release any residual pressure. Third, the two, side openings 70 and the bottom void 52 are exposed by removing the closure plates 74 and plate 54. These steps ensure the proper use of the novel valve 10. As will be evident, this side-ported, line blind valve 10 can be used for isolating any process piping or vessels where spillage is not acceptable, and solids in the process media may cause plugging of the body cavities.

While I have described my invention in connection with a specific embodiment thereof, it is to be clearly understood that this is done only by way of example. In this embodiment, the closure plates 74 are held against the sides 18 and 20 of the body 12, in closure of the openings 70, by camming clamps 78 which are rotatably supported on eyebolts 80. Alternate means for securing the plates 74 removably to the sides 18 and 20 can readily be used, such as thumbscrews, or the like. Too, the plug 60 in the plate 54 can just as easily be replaced with a vent valve. Too, the handwheel operator can be replaced with a cylinder operator, or other means of opening and closing the valve 10. These and all other modifications of the disclosed embodiment of the valve 10, which will occur to others, are deemed to be within the ambit of my invention and embraced by the appended claims.

I claim:

1. A gate-type, line blind valve, comprising:

a body having spaced-apart, front and rear walls, and side walls joined to said front and rear walls; wherein all said walls comprise means for cooperatively defining a valve shell having an interior; and inlet and outlet fluid apertures in said front and rear walls;

resilient seats set in said apertures;

gating means interposed, and movable, between said front and rear walls, for (a) sealingly engaging said seats, and (b) exposing said apertures to, and occluding said apertures from, the ambient; and wherein said side walls have porting means for exposing said interior of said shell to, and occluding said interior from, the ambient; and said porting means comprises openings in said side walls in substantial alignment with said apertures for allowing any fluid spillage within said interior of said shell to vent to the ambient, and closures removably fixed to said side walls for occluding said porting means.

2. A gate-type, line blind valve, according to claim 1, wherein:

said closures comprise plates and means for releasably fastening said plates over, and in closure of, said openings.

3. A gate-type, line blind valve, according to claim 2, wherein:

said fastening means comprises clamps (a) fixed to said side walls, and (b) engageable with said plates.

4. A gate-type, line blind valve, according to claim 1, further including:

means lining said shell, and guidingly receiving said gating means therebetween.

5. A gate-type, line blind valve, according to claim 1, further including:

means in communication with said interior for selectively releasing fluid pressure from said interior.

6. A gate-type, line blind valve, according to claim 5, wherein:

said body further has a base; and said base has a void formed therein; and further including a sealing plate removably fastened to said base and in closure of said void; and wherein said fluid pressure releasing means comprises (a) a conduit fixed to said sealing plate, and (b) a plug removably set in said conduit.

7. A gate-type, line blind valve, according to claim 1, wherein:

said gating means comprises means extending externally of said body for moving said gating means between said front and rear walls.

8. A gate-type, line blind valve, according to claim 7, wherein:

said gating means includes a planar gate; and said moving means comprises a threaded rod, and an internally threaded handwheel threadedly engaged with said rod; and an end of said rod is coupled to said gate.

9. A gate-type, line blind valve, according to claim 8, further including:

a stanchion mounted atop said body; and wherein said handwheel is journaled in said stanchion.

10. A gate-type, line blind valve, according to claim 8, further including:

means mounted atop said body, and sealingly encompassing said gate, for preventing exposure of said interior to the ambient.

11. A gate-type, line blind valve, according to claim 10, wherein:

said ambient exposure preventing means comprises (a) a seal circumscribing said gate, and (b) a packing gland for adjustably tightening said seal against said body and said gate.

12. A gate-type, line blind valve, comprising:

a body having spaced-apart, front and rear walls, and side walls joined to said front and rear walls; wherein all said walls comprise means for cooperatively defining a valve shell having an interior;

inlet and outlet fluid apertures in said front and rear walls;

resilient seats set in said apertures;

gating means interposed, and movable, between said front and rear walls, for (a) sealingly engaging said seats, and (b) exposing said apertures to, and occluding said apertures from, the ambient; and wherein said side walls have porting means for exposing said interior of said shell to, and occluding said interior from, the ambient;

said porting means comprises openings in said side walls and being in substantial alignment with said apertures for allowing any fluid spillage within said interior of said shell to vent to the ambient, and closures removably fixed to said side walls;

said closures comprise plates and means for releasably fastening said plates over, and in closure of, said openings;

said fastening means comprises clamps (a) fixed to said side walls, and (b) engageable with said plates; and said clamps are pivotably mounted to said side walls and have camming surfaces for forcing said plates fast against said side walls.

\* \* \* \* \*